United States Patent
Scheeres

(10) Patent No.: US 9,956,736 B2
(45) Date of Patent: May 1, 2018

(54) WASTE PROCESSING APPARATUS AND METHOD

(71) Applicant: MASSMELT LTD, Cardiff (GB)

(72) Inventor: David Scheeres, Pembroke (GB)

(73) Assignee: MASSMELT LIMITED, Cardiff (GB)

( * ) Notice: Subject to any disclaimer, the term of this patent is extended or adjusted under 35 U.S.C. 154(b) by 1029 days.

(21) Appl. No.: 13/837,762

(22) Filed: Mar. 15, 2013

(65) Prior Publication Data

US 2014/0007783 A1 Jan. 9, 2014

Related U.S. Application Data

(63) Continuation of application No. PCT/GB2011/001362, filed on Sep. 16, 2011.

(30) Foreign Application Priority Data

Sep. 16, 2010 (GB) .................................. 1015495.3

(51) Int. Cl.
*B30B 1/18* (2006.01)
*B30B 9/12* (2006.01)
(Continued)

(52) U.S. Cl.
CPC .......... *B30B 1/186* (2013.01); *B29B 17/0026* (2013.01); *B29C 47/0021* (2013.01);
(Continued)

(58) Field of Classification Search
CPC ..... B30B 11/227; B30B 11/241; B30B 1/186; B30B 9/125; B30B 15/34; B30B 11/24;
(Continued)

(56) References Cited

U.S. PATENT DOCUMENTS 2,013,026 A * 9/1935 Bowling ................. B30B 11/00 206/38
2,412,709 A * 12/1946 Bowling ................. B30B 11/00 425/311

(Continued)

FOREIGN PATENT DOCUMENTS

DE 2124510 A1 11/1972
EP 0839564 A2 5/1998
(Continued)

OTHER PUBLICATIONS

International Search Report on PCT/GB2011/001362—dated Mar. 29, 2012.
(Continued)

*Primary Examiner* — Jimmy T Nguyen
(74) *Attorney, Agent, or Firm* — Steven R. Vosen

(57) ABSTRACT

The present invention relates to an apparatus and method for processing of waste and in particular processing involving a volumetric reduction of waste materials. There is an apparatus for processing waste material comprising a compaction compartment for receipt of waste material, the compaction compartment have a screw vane for processing waste material through the compaction compartment and a waste material outlet. In one aspect the apparatus comprises a heating zone including an arrangement for heating the waste material received from the waste outlet, the apparatus further comprising a cooling zone including a cooling arrangement for cooling the waste material received from the heating zone. In another aspect, at least one of the screw vane or wall comprises one or more ports therein for transfer of liquid from the waste material, the one or more ports having a port inlet and a port outlet, wherein the area of the opening defined by the port inlet is different to the area of the opening defined by the port outlet. In a further aspect, a heating zone for receiving waste material from the waste material outlet (Continued)

is provided where the heating zone includes an arrangement for heating the waste material in the heating zone, and a blocking element for impeding movement of waste material from the heating zone.

11 Claims, 4 Drawing Sheets

(51) Int. Cl.
| | |
|---|---|
| B30B 15/34 | (2006.01) |
| B29B 17/00 | (2006.01) |
| B29C 47/00 | (2006.01) |
| B29C 47/86 | (2006.01) |
| B29C 47/92 | (2006.01) |
| B30B 11/22 | (2006.01) |
| B30B 11/24 | (2006.01) |
| B29C 47/88 | (2006.01) |
| B29C 47/38 | (2006.01) |
| B29C 47/60 | (2006.01) |
| B29C 47/76 | (2006.01) |
| B29C 47/90 | (2006.01) |

(52) U.S. Cl.
CPC ...... *B29C 47/0066* (2013.01); *B29C 47/6018* (2013.01); *B29C 47/6075* (2013.01); *B29C 47/862* (2013.01); *B29C 47/864* (2013.01); *B29C 47/8805* (2013.01); *B29C 47/908* (2013.01); *B29C 47/92* (2013.01); *B30B 9/125* (2013.01); *B30B 11/227* (2013.01); *B30B 11/241* (2013.01); *B30B 15/34* (2013.01); B29C 47/38 (2013.01); B29C 47/6012 (2013.01); B29C 47/76 (2013.01); B29C 47/90 (2013.01); B29C 2947/92514 (2013.01); Y02W 30/62 (2015.05)

(58) Field of Classification Search
CPC ... B30B 9/18; B29B 17/0026; B29C 47/0021; B29C 47/0066; B29C 47/862; B29C 47/864; B29C 47/92; B29C 47/6018; B29C 47/6075; B29C 47/38; B29C 47/6012; B29C 47/76; B29C 47/90; B29C 2947/92514; Y02W 30/62
USPC ... 100/50, 96, 117, 147, 148, 303, 337, 338, 100/339, 904
See application file for complete search history.

(56) References Cited

U.S. PATENT DOCUMENTS

| | | | | |
|---|---|---|---|---|
| 2,649,618 | A * | 8/1953 | Rhodes | B29C 47/0066 100/904 |
| 4,520,724 | A * | 6/1985 | Costarelli | B29B 13/065 100/117 |
| 4,581,992 | A * | 4/1986 | Koch | B30B 9/121 100/117 |
| 5,114,331 | A * | 5/1992 | Umehara | B29B 9/06 264/916 |
| 6,854,382 | B2 * | 2/2005 | Jan | A23N 1/00 100/117 |
| 2005/0098049 | A1 * | 5/2005 | Shepherd | B30B 9/12 100/117 |
| 2007/0017390 | A1 * | 1/2007 | Kim | B29B 17/0026 100/316 |

FOREIGN PATENT DOCUMENTS

| | | |
|---|---|---|
| GB | 2008/001560 A1 | 11/2008 |
| JP | 56148495 A * | 11/1981 |
| JP | 7-060749 A | 3/1995 |
| JP | 8-173932 A | 7/1996 |
| JP | 08-173932 A | 7/1996 |
| JP | 09-148166 A | 6/1997 |
| JP | 10-264157 A | 10/1998 |
| RU | 2062556 C1 | 6/1996 |
| WO | 2008/054061 A1 | 5/2008 |

OTHER PUBLICATIONS

UK Intellectual Property Office Search Report on GB1015495.3—dated Jan. 20, 2012.

* cited by examiner

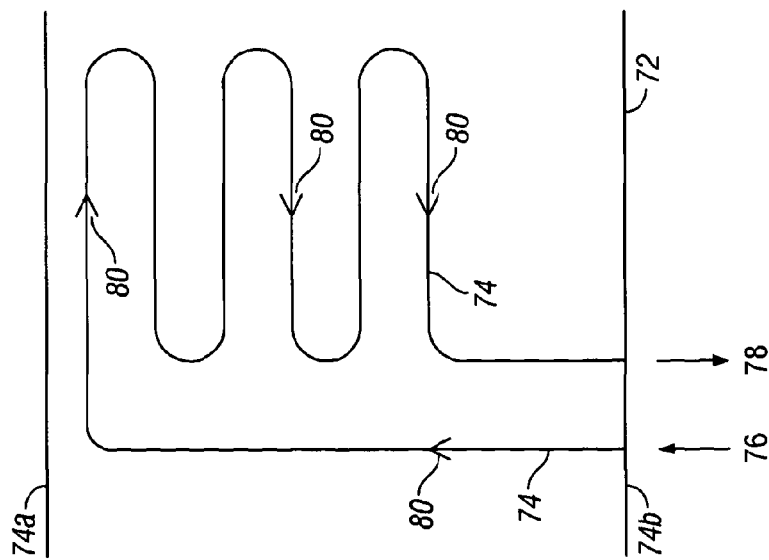
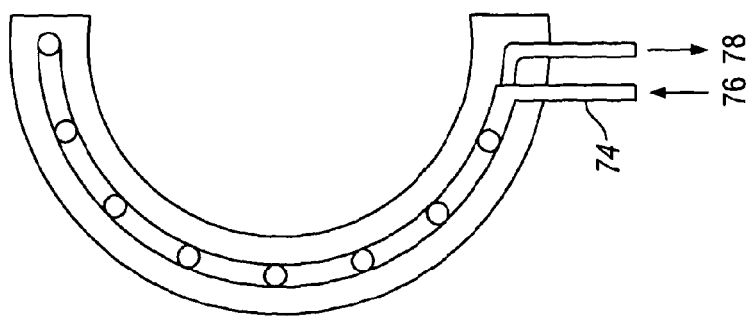
FIG. 4a
FIG. 4b

WASTE PROCESSING APPARATUS AND METHOD

CROSS-REFERENCE TO RELATED APPLICATIONS

This is a continuation of International Patent Application PCT/GB2011/001362, with an international filing date of Sep. 16, 2011, which claims priority of United Kingdom Patent Application No. 1015495.3 filed Sep. 16, 2010, the entire contents of which are hereby incorporated by reference herein and made part of this specification.

BACKGROUND OF THE INVENTION

Field of the Invention

The present invention relates to apparatus and methods for processing and treatment of waste and in particular processing involving a volumetric reduction of waste material.

Discussion of the Background

A problem associated with increasing consumption is the associated increase in waste production. Whilst efforts continue to reduce the amount of unnecessary waste that is produced, or to recycle higher value components within the waste stream, there is always going to be a proportion of the waste that cannot be effectively re-used.

A problem with varied forms of waste materials is that they can be bulky and take up a great amount of space if left unprocessed. This is especially true for plastics, for example polyethylene, which is widely used as packaging material. There are several known methods for treating waste materials. Plastics such as thermoplastic foamed resins can be burnt in incinerators. In effect, incineration of waste materials converts the waste into heat, gaseous emissions, and residual solid ash. A problem with this method is that the incinerators tend to become damaged by the high heat generated when burning the plastics and harmful gases such as dioxin and chlorine are produced, as well as other pollutants.

Consigning waste to landfill is one of the most traditional methods of waste disposal, and it remains a common practice in most countries. However, older, poorly-managed landfills can create a number of adverse environmental impacts such as wind-blown waste and litter, attraction of vermin, generation of a toxic waste known as leachate which can pollute groundwater and surface water, and a generation of landfill gas, mainly composed of carbon dioxide and methane, which is produced as organic waste breaks down anaerobically. To overcome these problems, many landfills are covered with earth to prevent attracting vermin and to reduce the amount of wind-blown litter. Furthermore, space in landfills is at a premium and the cost of dumping waste material is calculated on a weight basis.

Compacting devices can be used to reduce the volume occupied by waste materials. A known type of compactor is disclosed in PCT/GB2008/001560. Such a compactor comprises a rotating shaft having a screw vane located in a conical chamber wherein the waste material is driven through the chamber by the rotating shaft and is deformed and compressed before finally being discharged to a heater and through a nozzle.

EP0662043 discloses an alternative compaction method and apparatus which utilises a compaction chamber and vane for conveying the waste material through the passage and includes an exit nozzle which defines an internal transverse cross-sectional area which enlarges and reduces respectively in response to increasing and decreasing material pressure. Effectively, a plurality of fingers is provided at the outlet to control the size of the extrudate. However, such an apparatus puts severe force and stresses in the shaft and furthermore, the waste re-expands once it is passed through the nozzle.

Aspects of the present invention provide an improved waste processing apparatus.

According to a first aspect of the present invention there is an apparatus for processing waste material comprising a compaction compartment for receipt of waste material, the compaction compartment having a screw vane for processing waste material through the compaction compartment and a waste material outlet, the apparatus further comprising a heating zone including an arrangement for heating the waste material received from the waste outlet, the apparatus further comprising a cooling zone including a cooling arrangement for cooling the waste material received from the heating zone.

A significant benefit associated with cooling of the waste material subsequent to heating is that the extudate solidifies in a suitable manner to allow it to be cut to length and handled safely. The extrudate will not deform and any significant part of the liquid waste that forms the outer surface of the extrudate cannot leak away leading to possible sudden expansion of the extrudate caused by the compressed waste material. It will be appreciated that the heating cycle causes flow of the waste polymer at the periphery of the extrudate, and as such the immediate cooling or chilling ensures that this fluid and heated peripheral waste polymer immediately cools and solidifies ensuring encapsulation of the remaining waste. This ensures structural integrity of the waste extrudate leaving the cooling zone. The cooling zone is also is beneficial in particular with respect to optimising the compaction process and utilising the minimum energy requirement for ensuring compaction due to the trapping of the waste material in the extrudate.

The waste material beneficially passes through the compaction compartment, the heating zone and the cooling zone in series. The heating zone and cooling zone define a waste material transfer path from the compaction compartment to the exit port of the apparatus. The transfer path is defined by a conduit or channel that is beneficially continuous meaning that there are no obstructions impeding movement of the waste product along the transfer path. It will be appreciated that the cross-sectional profile of the conduit or channel may be altered either in entirety or gradually, preferably in the heating zone, to provide profiled extrudate as required. The cooling arrangement beneficially includes a conduit for receipt of waste material, the conduit having a plurality of cooling channels configured to extend at least partially around the conduit through which the waste material is arranged to travel.

The cooling channels beneficially extend through a wall defining the conduit. In one embodiment, the conduit includes cooling channels at least partly provided in a cooling jacket, the cooling jacket at least partially surrounding the wall defining the conduit. Such a configuration is beneficial as this provides a more easily manufactured product as the cooling jacket can be provided around the conduit. The cooling jacket is beneficially provided in two or more sections arranged to seat about a wall defining the conduit. Providing the cooling jacket in two generally semi-circular portions improves ease of assembly whilst also providing effective cooling. It will be appreciated that a single section comprising a substantially circular jacket could be supplied over the conduit however is without assembly complications. By providing two sections, however, for again ease of manufacture, two inlets and two outlets for coolant fluid flow should be provided.

A single inlet and single outlet may be provided however in such a configuration coolant fluid flow channels should beneficially match up in assembly in order to ensure optimal fluid flow.

A blocking element is beneficially provided for impeding movement of the waste material from the apparatus and preferably from the cooling zone. The blocking element is preferably positioned downstream of the cooling zone and is arranged to enable impeding and preferably blocking of the waste material exiting the apparatus. It will be appreciated that the blocking element may be retractably positioned to block movement between the heating and cooling zones. The benefits of providing a blocking element or gate is that improved water extraction from the waste material can be achieved thereby increasing the density and quality of extudate. The blocking element is beneficially retractable between a blocking configuration and an open configuration and beneficially includes a cutting blade. Accordingly, the cutting blade itself forms the blocking element or gate.

A control arrangement is preferably provided comprising a control arrangement including a receiver for receipt of a signal from the pressure sensor, wherein the control arrangement controls activation of the screw vane in response to receipt of the signal from the pressure sensor.

The control arrangement may cause pausing of rotation of the screw vane once a predetermined value of pressure at the blocking element is achieved.

The apparatus preferably further comprises an exhaust vent arrangement for exhausting gases from the apparatus. The exhaust vent arrangement is preferably located downstream of the cooling zone. The exhaust vent arrangement is preferably arranged to receive gases from the outlet of the cooling zone and includes a fan arrangement arranged to draw exhaust gases through a filter. A suitable filter may be carbon, Hepa, electrostatic or zeolite. It is beneficial to provide such an exhaust vent arrangement as the apparatus is particularly suitable to compact waste that may be contaminated with food stuffs and other organics which may lead to unacceptable odours.

According to a second aspect of the present invention there is an apparatus for processing waste material comprising a compaction compartment defined by a wall for receipt of waste material, a screw vane for processing waste material through the compaction compartment and a waste material outlet, wherein at least one of the screw vane or wall comprises one or more ports therein for transfer of liquid from the waste material, the one or more ports having a port inlet and a port outlet, wherein the area of the opening defined by the port inlet is different to the area of the opening defined by the port outlet.

There are significant benefits associated with this aspect of the present invention. The pressure drop through the port from the smaller opening at the port inlet to the larger opening of the port outlet means the pressure drops and accordingly reduces the probability of blockages occurring. The flowpath of the liquid is improved through the increase of the effective opening side from the inlet to the outlet. Accordingly, liquid can effectively escape through the port whilst a chance of the port being blocked by the waste material is reduced.

The area of the opening defined by the port inlet is preferably less than the area of the opening defined by the port outlet. The change in area defined by the port inlet and the port outlet may occur step wise between the port inlet and the port outlet. In one embodiment the port inlet is substantially cylindrical however alternative shapes are envisaged, for example slots. The port outlet is also beneficially substantially cylindrical however, again may be of different shapes.

The diameter of the port inlet is preferably between 2 mm and 10 mm assuming that the port inlet is cylindrical. The diameter of the port outlet is beneficially between 6 mm and 30 mm.

The screw vane beneficially comprises a shaft having a blade extending therefrom and the one or more ports are defined in the shaft, the shaft further comprising a channel extending through a portion of the longitudinal length of the shaft. Accordingly, liquid may pass into the channel provided in the shaft and travel along the shaft away from the heating zone.

The shaft beneficially comprises a head or tip having an opening therein, wherein the opening is substantially transverse to the longitudinal length of the shaft. In one embodiment liquid may be released from the tip of the shaft adjacent the heating zone.

This liquid may then travel through the centre of the extrudate.

An exhaust vent arrangement is preferably provided for exhausting gases from the outlet of the apparatus.

In a further exemplary embodiment of the present invention there is an apparatus for processing waste material comprising:
  a compaction compartment for receipt of waste material, the compaction compartment having a screw vane for processing waste material through the compaction compartment and a waste material outlet;
  a heating zone for receiving waste material from the waste material outlet, the heating zone including an arrangement for heating the waste material in the heating zone; and
  a blocking element for impeding movement of waste material from the heating zone.

A benefit of this aspect of the present invention is an increased removal of liquid from the waste material and the extudate. Increasing the pressure on the waste material and the extudate ensures that a significant volume of excess liquid is removed. It is important for safety purposes and also for the quality of the extudate to remove as much liquid which may turn into gaseous phase in the heating zone as early as possible in the process.

The blocking element is beneficially retractable between the blocking configuration and an open configuration. This enables the extudate to be released from the apparatus once compression has occurred. It is preferred that the blocking element includes a cutting element comprising a cutting blade. Accordingly, the blocking element serves to act as a gate for the extudate leaving the apparatus and also acts as a cutting blade.

There is beneficially provided an arrangement for determining the pressure at the blocking element. A control arrangement is beneficially provided including a receiver for receipt of a signal from the pressure sensor, wherein the control arrangement controls activation of the screw vane. Once a predetermined value of pressure at the blocking element is achieved, the screw vane is paused and the blocking element retracted. The control arrangement beneficially controls movement of the screw vane.

The apparatus beneficially further comprises a cooling zone including a cooling arrangement for cooling the waste material from the heating zone. Accordingly, the cooling zone is located downstream of the heating zone, and the blocking element is preferably positioned downstream of the outlet from the compressed waste material from the cooling zone.

At least one of the screw vane or wall defining the compaction compartment preferably comprises one or more ports therein for transfer of liquid from the waste material, the one or more ports having a port inlet and a port outlet, wherein the area of the opening defined by the port inlet is different to the area of the opening defined by the port outlet.

An exhaust vent arrangement is preferably provided for exhausting gases from the apparatus.

According to one aspect of the present invention there is a method of processing waste material comprising the steps of:
- adding waste material to a compaction compartment having a screw vane therein;
- transporting and compacting the waste material through the compaction compartment through rotation of the screw vane to a heating zone;
- heating the compacted waste material in the heating zone;
- transporting the compacted waste material through an outlet of the heating zone;
- impeding movement of the compacted waste material from the outlet of the heating zone by providing a blocking element whilst simultaneously rotating the screw vane to compress the compacted waste material.

The method of further comprising the step of pausing activation of the screw vane following compression of the compacting material. A further step may comprise retracting the blocking element from impeding the compacted waste material. A further method step may comprise activating the screw vane such that the compacted waste material passes the blocking element, and preferably subsequently pausing activation of the screw vane and cutting or otherwise separating the compacted waste material. The waste material is preferably cut by bringing in the blocking element into communication with the extruded waste material. The method may further comprise the step of cooling the waste material in a cooling zone subsequent to the waste material exiting the outlet of the heating zone.

Also according to aspects of the present invention are:
A method of processing waste material comprising:
- providing a compaction compartment having a screw vane therein and adding waste material thereto;
- transporting and compacting the waste material through the compaction compartment to a heating zone;
- heating the waste material and subsequently transporting to a cooling zone and cooling the waste material.

A method of processing waste material comprising:
- providing a compaction compartment defined by a wall, and a screw vane in the compaction compartment and adding waste material thereto;
- transporting and compacting the waste material through the compaction compartment to a heating zone;
- heating the waste material;
- wherein at least one or more ports are provided in one or both of the screw vane and the wall, the one or more ports having a port inlet and a port outlet, wherein the area of the opening defined by the port inlet is different to the area of the opening defined by the port outlet.

Reference will now be made, by way of example, to the accompanying drawings in which:

BRIEF DESCRIPTION OF THE SEVERAL VIEWS OF THE DRAWINGS

FIGS. 4a and b are schematic side and transverse cross section respectively of components of a cooling system used in exemplary embodiments of aspects of the present invention.

DETAILED DESCRIPTION OF THE INVENTION

Figure 1:
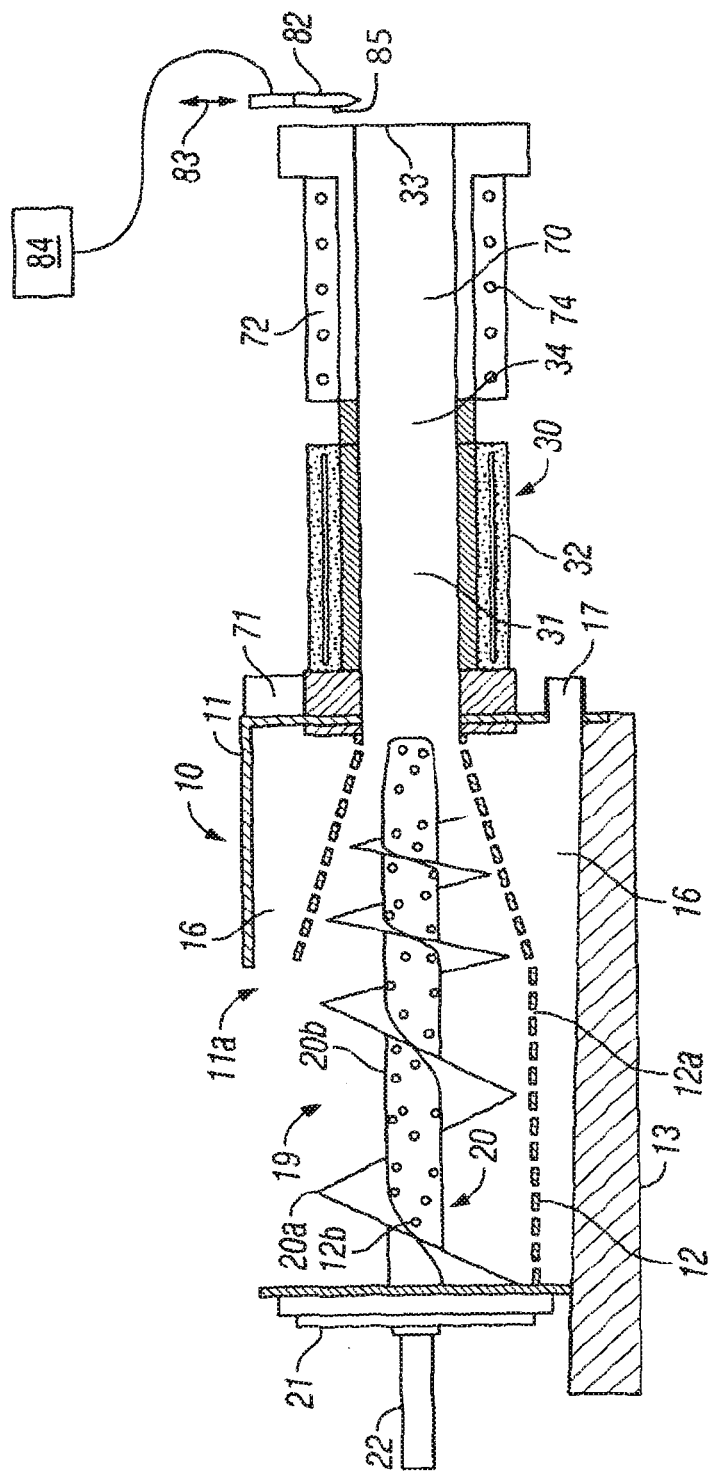
FIG. 1 is a cut away side view of an apparatus incorporating aspects of the present invention.

An exemplary embodiment of the invention is shown in FIG. 1. The apparatus 10 comprises a housing 11, which is typically metal or metal alloy—e.g. steel. The housing 11 encloses a compaction compartment 19. The compaction compartment 19 is substantially cylindrical in cross section and, as such, defines a barrel 12 that extends longitudinally along the length of the housing 11. The barrel 12 substantially encloses the compartment 19 with the exception of an opening 11a that is located in the uppermost portion of the barrel 12 and which allows for the introduction of waste material that is to be processed into the compartment 19. The barrel 12 is suitably formed of case hardened bimetallic steel, although other types of abrasion resistant material are also suitable.

For the purposes of clarity the terms "forward" and "rearward" will be used to define the longitudinal termini of the apparatus 10 and reflect the movement of waste along an axis running from the entry point (rearward) to the exit point (forward) within the apparatus. Located within the compartment 19 is a screw vane 20, adapted to be suitable for cutting and breaking up the waste material and transporting and compacting it through the compartment 19. The screw vane 20 comprises a shaft 20b, about which is located a flight 20a which extends radially outwardly in the form of a helical ridge/thread that extends around the shaft 20b from the rearward portion of the compartment 19 to the forward portion of the compartment 19. The shaft 20b is substantially cylindrical and rotates about a bearing 21 located at the rearward end of the housing. There is no requirement for the provision of a bearing at the forward base plate 14 as the plasticised material in the heating zone acts to maintain and support the shaft when in use.

The flight 20a of the screw vane 20 varies in diameter along the length of the shaft 20b. The diameter of the flight 20a and the shaft 20b are defined with respect to the central axis of rotation of the screw vane 20. Towards the rearward end of the shaft 20b the flight 20a may have a diameter that is up to 4 times greater than the diameter of the shaft 20b. The diameter of the flight 20a diminishes along the length of the shaft to a diameter that is substantially as little as 1.5 times the diameter of the shaft 20b. The compaction chamber may also take other forms, generally at or adjacent the tip or outlet. This is to enable the final extrudate to be shaped as required, and as such may, for example, be square or rectangular in cross section.

It will be appreciated that the outlet 34 of the heating zone 31 may as required comprise an extrusion nozzle depending on the specific requirements of the extudate. It will be appreciated that if the extudate is to be used for construction purposes then square, rectangular or even star shaped extudate can be provided through the provision of a suitable cross section of nozzle or outlet 34, or alternatively the outlet of the heating zone and cross-section of the cooling zone may have this configuration. An accelerant may be added to the waste material such as styrene in the event the waste material is to be used for fuel logs.

It is beneficial to provide a shroud adjacent the outlet 33 arranged to remove unwanted fumes from the apparatus. As organic matter such as waste foodstuff may be present in the waste material, a vented hood/shroud is beneficial including a suction means for drawing the fumes though a filter incorporating carbon, Hepa, zeolite or being electrostatic.

In an embodiment of the invention the barrel 12 comprises a plurality of apertures 12a that enable fluid communication between the compartment 19 and an adjacent drainage compartment 16. The apertures 12a allow for liquid contained within the compacted waste stream to exit the compartment 19 into the drainage compartment 16. The drainage compartment 16 may extend the full length of the housing, or occupy only a portion of the housing. Liquid that accumulates within a sump located in the drainage compartment 16 is able to drain out of the apparatus via a drainage port 17 for further processing. Optionally, liquid may be forcibly expelled from the apparatus by a pump (not shown). The pump may be located within or adjacent to the drainage port 17 and can be used to generate a negative pressure within the drainage compartment. In a preferred embodiment of the invention the lower surface of the drainage compartment 16 slopes towards the drainage port 17. The lower surface of the drainage compartment 16 is defined by the base of the apparatus 13. The apertures 12a may be arrayed with an even spacing within the barrel 12. Alternatively, the density of aperture 12a spacing can vary along the barrel so as to control the drainage of liquids at various positions along the waste compaction path. Typically the apertures 12a are in the form of substantially circular apertures or elongated slots having non-uniform cross sectional diameters.

Apertures are also beneficially provided in the shaft 20b and barrel 12 and again the apertures may be varied in terms of spacing for example. The shaft 20b has a hollow core (not shown) and the liquid expelled from the waste material may pass into the core and either be extracted through apertures towards the motor drive portion or rearward part of the apparatus away from the heating zone 31 or alternatively may pass through apertures 12b away from the tip of the shaft 20b. This will naturally occur as the pressure of the compacted material increases towards the tip of the barrel 12 near the heating zone 31 and thus does the pressure of liquid in the compaction compartment and into the core of the shaft. Accordingly, any liquid passing into the shaft 20b will do so under pressure from adjacent the tip of the shaft 20b and as such will be forced down the conduit within the shaft 20b and out through one or more apertures or slots adjacent or near the drive side of the shaft 20b.

The apertures 12a and 12b in the shaft 20b or the barrel 12 may be slots, for example or may be circular. These apertures define ports and are effectively provided having a port inlet and a port outlet wherein the port inlets and port outlets are defined with respect to the movement of waste liquid. For the avoidance of doubt, the liquid travels through the inlet first. The area of the opening defined by the port inlet is different to the area of the opening defined by the port outlet. This provides important benefits in that such a change in the port cross sectional area meant that the effectiveness of reduction in blocking was increased. Accordingly, such a configuration enables the port to remain clear thereby improving the effectiveness of liquid removal. A straight bore quickly becomes blocked with waste material however it is beneficial to provide a larger area at the waste liquid outlet in order to significantly reduce the pressure on the fluid leaving the waste stream and as such maintains the bore clear. It is important that venting fluid or steam during the process occurs freely as this ensures the quality of the extudate leaving the machine as the density is improved. Accordingly, should the extudate be passed to a landfill for example, the overall weight of the waste material is reduced as there is no or little liquid present. If the material is to be used for other purposes then the quality of the material is improved.

Figure 3A:
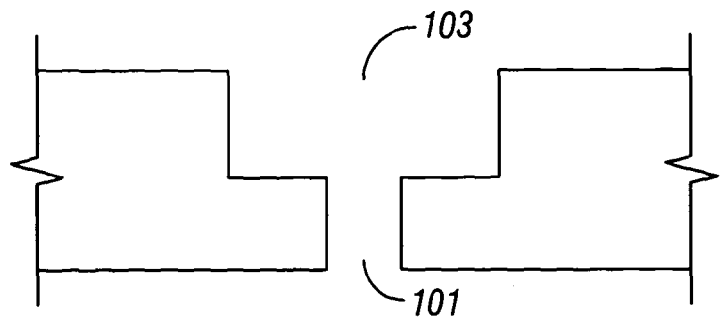
FIGS. 3 a-c are schematic representations of ports provided either or both of the shaft or barrel as found in an exemplary embodiment of an aspect of the present invention.
Figure 3B:
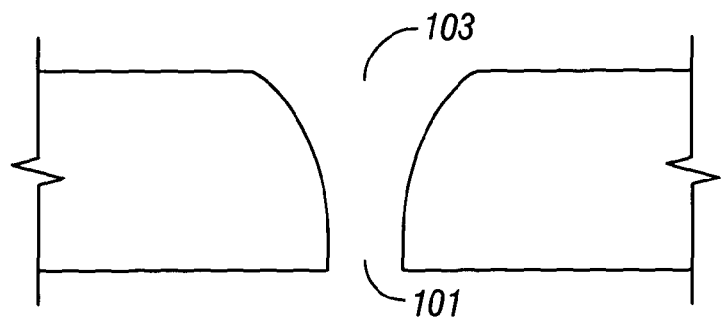
Figure 3C:
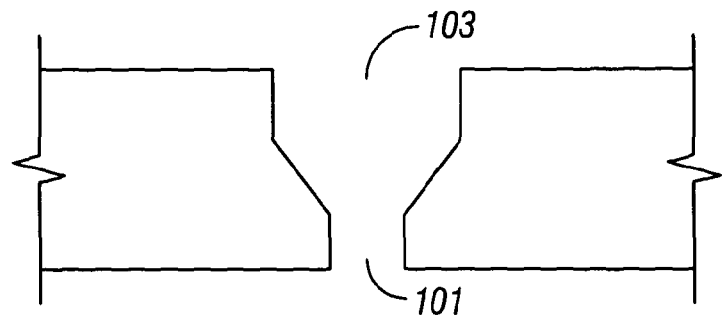

With reference to FIG. 3, there is a schematic representation of the ports that may be found in the barrel 12 or the shaft 20b. The port inlet 101 and port outlet 103 are represented and it is clear that there is an increase in the cross sectional area of the port outlet relative to the port inlet. In FIG. 3a, the reduction in cross sectional area occurs in a single step whereas in FIG. 3b the increase in cross sectional area is more gradual. In FIG. 3b, the reduction in cross sectional area is again step wise however there is a combination of a constant cross sectional area followed by a portion in which the increase is gradual followed by a further constant cross sectional area portion. The diameter of the port inlet, if the port inlet is substantially circular, is approximately between 2 mm and 10 mm. The diameter of the outlet is beneficially between 6 mm and 30 mm. It will, however, be appreciated that the relative diameters may be changed dependent on the waste stream for example. The inner surface of the barrel 12 that defines the compaction compartment 19 may also comprise channels or grooves that direct liquid released from the waste stream towards the plurality of apertures 12a.

Following compaction of the waste stream and extrusion of the compacted material through the port 15 in the base plate 14, the compacted waste stream is urged into a heating zone 31 that is defined by an elongated conduit 30. The conduit is suitably manufactured from an abrasion resistant material such as case hardened bimetallic steel.

In a specific embodiment of the invention, the conduit 30 is enshrouded with a heating unit 32 that allows for elevation of the temperature in the heating zone 31 to a temperature that facilitates the melting of at least some of polymeric materials located within the compacted waste stream but which is below the carbonisation temperature of either the polymers or the organic matter within the waste stream. Low melting point polymers include, for example, film waste and bottles comprising polyethylene terephthalate (PET), high density polyethylene (HDPE), low density polyethylene (LDPE), polypropylene and polyvinyl chloride (PVC). The low melting point polymers located within the compacted waste stream melt and mix further with the remainder of the waste material so as to form a semi-liquefied compaction slurry of waste that is urged along the heating zone 31 due to displacement caused via further waste entering the heating zone 31 via the port 15.

A variety of mechanisms are available for applying thermal energy to the heating zone 31. In a specific embodiment of the invention shown in FIG. 1, an electrical conduction heater 32 is comprised within the conduit 30, allowing for controlled heating along the length of the conduit 30. Electrical resistance heaters are particularly suitable, of ceramic, cast aluminium or bronze construction, comprising an integrated cooling circuit and controlled by a thermocouple to adjust the temperature for precise temperature control. Other types of heating sources are possible, including electromagnetic induction, heat exchanger and microwaves. In a specific embodiment of the invention a temperature gradient can be applied for the rearward end of the heating zone 31 towards the forward end of the heating zone 31. In an alternative embodiment of the invention the gradient of temperature can increase to a maximum within the central region of the heated zone 31 and then diminish towards the extrusion nozzle 33. In yet another embodiment of aspects of the present invention, the heating zone may be extended to heat the waste material found in the compaction chamber in which the screw vane is located. This aids support of the screw vane in the compaction chamber thereby meaning that a bearing adjacent the tip of the shaft 20b is not required, improving flow characteristics of the compacted material.

Figure 2:
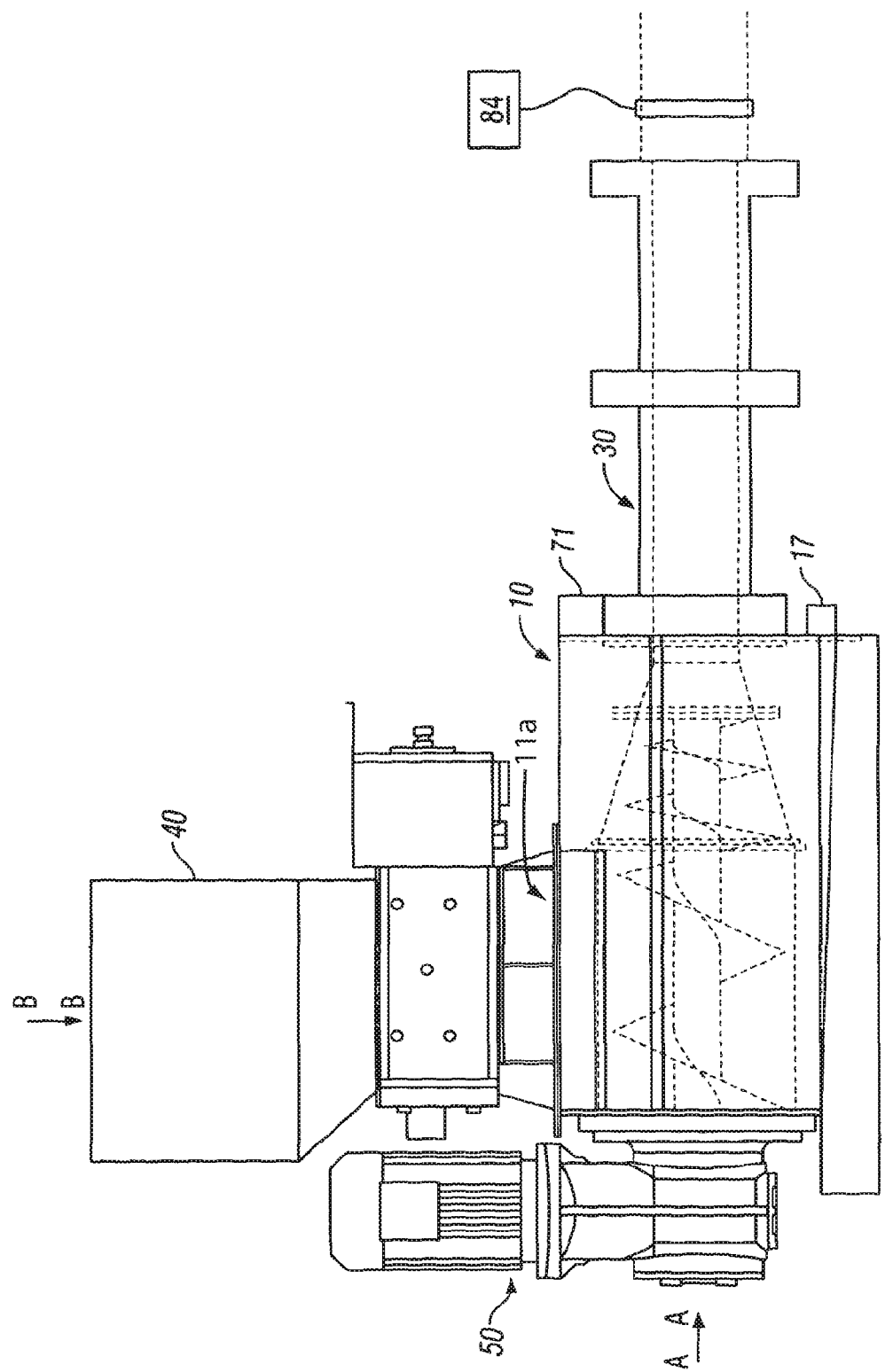
FIG. 2 is a schematic side view of an apparatus of an exemplary embodiment incorporating aspects of the present invention showing additional features.

The rotatable shaft 20b can be engaged with a drive assembly via the portion of the shaft 22 that extends outwardly from the rearward end of the housing 11. FIG. 2 shows a drive motor 50 that provides motive force to drive the rotation of the screw vane 20 in a forward direction. In the event of blockage, so as to prevent damage to the screw vane 20 and motor 50, the drive motor 50 can be adjustable for speed and may further comprise a thrust bearing. Furthermore, the ultimate density of the output processed waste can be altered by varying the speed of rotation of the shaft. Typically, the shaft rotates at a speed in the region of 2 to 8 rpm. In a particular embodiment of the invention, the drive motor 50 includes a reverse gearing arrangement that allows for the screw vane 20 to be driven in a rearward direction so as to further assist in clearance of potential blockages.

The apparatus of the invention is suitable for treatment of a variety of waste streams, either heterogeneous or homogeneous. It is of particular advantage that the waste can include liquid-containing materials which are increasingly prohibited from inclusion in landfill, because the apparatus allows for the extraction of the liquid component from the waste stream. In a particular embodiment of the invention, the apparatus is suitable for separation of liquid waste from solid waste, for example in the treatment of waste which comprises a high liquid component, including timed food products, packaging containing waste vegetable matter, automotive oil filters, and liquid chemical or biohazardous waste located within metal drums or plastic barrels.

The heterogeneous waste that is treated by the process of the invention can be sterilised due to the heating, heavy compaction, and encapsulation within the polymeric component of the waste stream. For a waste stream, such as domestic waste, the extruded material is largely encapsulated within plastics and polymer materials comprised within the waste stream. The apparatus of the invention is particularly useful for processing heavily contaminated waste, such as hospital waste or food packaging containing blood, since the temperature profile and duration of the compaction process can be adjusted to exceed standard sterilisation procedures such as hospital autoclaving. The resultant material can be allowed to cool and is suitable for disposal in landfill in accordance with national regulations. An advantage of sterilised material is that it is virtually odourless and can be safely stored indefinitely.

In a specific embodiment of the invention, the nozzle or outlet 33 can be shaped so as to enable the extruded and encapsulated material to be formed into a configuration that is more appropriate for transport. Alternatively, the configuration of the extruded material can be such that it is suitable for alternative uses, such as in the construction industry, e.g. as a building block suitable for the construction of hard standing, or for underground cable conduit covers.

Referring back to FIG. 1 there is a cooling zone 70 that cools the extrudate received from the heating zone 31. The material received from the heating zone will begin to immediately cool the at least partially melted material. The dwell time in the heating zone 31 may be adjusted to provide sufficient heat to the material. It is beneficial that sufficient heat is provided in order to melt at least a portion of the outer surface of the material passing through the heating zone 31. This has the effect of sanitizing the outer surface of the waste to reduce chance of contamination, attraction of vermin etc. It will be appreciated that higher temperatures and/or longer dwell times can be utilised to sterilize the waste thereby enabling the apparatus to be used for medical or food waste. Following the cooling cycle the extrudate is a solid material having, in effect, a solidified skin, whereas the material inside the skin has not necessarily been melted. This reduces the costs associated with heating and still maintains the configuration of the extrudate. If, however, it is necessary for the subsequent properties and use of the extrudate, the dwell time and/or heat supplied to the waste material in the heating zone 31 can be manipulated accordingly. However, in general it is beneficial to provide as little heat as possible in order to ensure encapsulation of the waste material by an outer skin. In cutting the extrudate, and beneficially for subsequent use, it may be that the waste material re-expands which has considerable benefits in chemical pyrolysis where large surface areas are preferred for the process, and also in waste to energy boilers and furnaces where the re-expanded material can be converted very quickly.

As the heated material passes to the cooling zone 70, the extrudate is controlled in its solidification to enable it to be cut to length and handled safely. However, in order to ensure effective cooling, a cooled water jacket 72 is beneficially provided which may be cast aluminium. The cooling jacket beneficially contains a plurality of tubes 74 that conveys a coolant, for example water or glycol, which cools the waste material by heat transfer. As the co-efficient of expansion between stainless steel and aluminium is too similar to use stainless steel tubes, it is beneficial to use tubes with high nickel content such as Inconel 600. An exemplary configuration of the coolant flow tubes is provided in FIGS. 4a and 4b where FIG. 4a is a schematic side view of the cooling configuration within a section of the cooling jacket and FIG. 4b is a schematic cross-sectional transverse view of a section of cooling jacket according to an exemplary embodiment of the present invention. Referring to FIG. 4a, the cooling jacket 72 is shown schematically which is semicircular as clearly represented in FIG. 4b and forms half of the water cooling jacket 72. A second half of the cooling jacket 72 is provided in this manner for ease of assembly and manufacture. As can be seen with respect to FIG. 4a, there is a coolant inlet 76 and a coolant outlet 78. The tube 74 in FIG. 4a is represented in the 'in use' configuration, wherein the top of the tube 74a and bottom of the tube 74b are shown. The coolant flowpath extends from the inlet 76 through the tube 74 in the direction indicated by arrow 80. This means that the return flowpath travels through the cooling jacket in a longitudinal direction under gravity.

Referring to FIG. 4b, an end view of the coolant flowpath is shown which shows the beneficially semicircular nature of the cooling jacket and shows the inlet 76 and outlet 78 of the coolant's flow in the tube 74.

Once cooling has been achieved, the extrudate exits the cooling zone 70 via the outlet or nozzle 33. A blade 82 is beneficially provided to enable the extrudate to be cut to length which is beneficially propelled by either an electric or hydraulic actuator. Typically, conventional hydraulic blades for cutting cables etc have a thick profile, but the extrudate can be torn by a wide blade and as such the blade is narrow and supported by two slides (not shown) to enhance strength and rigidity. To deal adequately with some materials, the blade may be carbide coated or coated with ceramic or stainless steel impregnated Teflon material. In prior art arrangements, such cutting is typically achieved by utilising circular or band saws but such equipment creates noise and dust pollution and therefore is a potential fire hazard. Accordingly, in an exemplary embodiment of the present invention, the cutting is achieved by a blade which acts as a guillotine blade. In FIG. 1 the blade is represented in the raised configuration and is actuated by an electric actuator 84. Electric actuators are beneficially utilised due to their reliability. Accordingly, as represented in FIG. 1, the blade is raised and is in the configuration ready to cut the extrudate. However, when the extrudate is released from the cooling zone 70, the blade 82 is in the lowered configuration thereby providing a barrier or blockage to movement of the extrudate through the apparatus. During this time the screw vane is operable, increasing the pressure on the rearward end of the extrudate located within the heating zone 31. This also increases the pressure on the material being progressed through the apparatus via this screw vane, which increases the effectiveness of removal of liquid from the waste material. The blade 82 also comprises a pressure sensor 85 and a control arrangement 71 which includes a receiver for receipt of a signal from the pressure sensor monitors the pressure of the extrudate on the blade 82. Once a predetermined pressure has been achieved thereby ensuring improved dehydration, activation of the screw vane is paused and the blade is opened to the retracted configuration as represented in FIG. 1 and identified by arrow 83 The screw vane is again reactivated to force the extrudate to a predetermined length at which point the extrudate activates a sensor (not shown) to close the cutting blade 82 thereby cutting the extrudate to length. The cutting blade is then maintained in the lowered configuration and the machine process cycle is repeated. A collector may be provided beneath the guillotine blade to receive the cut lengths of waste material. The expelled compacted sterile block of waste can then be safely stored, transported, further processed or disposed of.

Referring to FIG. 2, in an embodiment of the invention the apparatus 10 comprises a hopper 40 having an upper opening into which waste material can be received and a lower opening which can lead directly to the opening 11a in the housing 11 (see FIG. 1).

A collector may be provided beneath the guillotine to receive the cut lengths of waste material. The expelled compacted sterile block of waste can then be safely stored, transported, further processed or disposed of.

The apparatus 10 may be provided with a control panel 71 which comprises a microprocessor/programmable logic controller which is programmed prior to installation of the apparatus and is integrated with the drive assembly to control the speed of rotation of the rotatable shaft, temperature of the heating arrangement, and optionally the temperature of the mould and the time period for each cycle of the guillotine. Different programmes can be used for different types of waste material. The control panel enables an unskilled operator to successfully use the apparatus of the invention. Furthermore, the control panel allows safe operation of the apparatus and prevents the apparatus from being damaged if solidified residual waste is present in the heating zone of the apparatus upon start-up by softening the residual waste before the drive is engaged.

It will be appreciated that monitoring equipment is provided for the apparatus for monitoring performance and noting when maintenance might be required. This information may be transmitted to a remote location. For example, a torque driver sensor may be provided on the drive by measuring amperage, and should a blockage occur then the amperage would increase. Once the amperage exceeds a predetermined value, then the drive shuts off. This information is relayed via a signal to an operator who maybe remote from the apparatus. A secondary safety feature is beneficially provided of a thrust bearing and a tertiary safety feature of a sacrificial cotter pin.

The apparatus is beneficially supplied in two halves on a skid for rapid installation.

The present invention has been described by way of example only and it will be appreciated by the skilled person that modification and variations can be made without departing from the scope of protection afforded by the appended claims.

The invention claimed is:

1. An apparatus for processing heterogeneous waste material comprising:
 a compaction compartment for receipt of waste material, the compaction compartment having a screw vane for processing waste material through the compaction compartment and a waste material outlet, wherein the screw vane terminates before a heating zone, the compaction compartment tapered towards the waste material outlet and the flight of the screw vane reducing in diameter towards the waste material outlet, the heating zone including an arrangement for heating the waste material received from the waste outlet and an extrusion nozzle, wherein at least one of the screw vane or wall defining the compaction compartment comprises one or more ports therein for transfer of liquid from the waste material;
 a cooling zone including a cooling arrangement for cooling the waste material received from the heating zone, wherein said cooling arrangement defines a conduit having a plurality of cooling channels configured to extend at least partially around the conduit; and
 a blocking element retractable between a blocking configuration and an open configuration for impeding movement of the waste material through the apparatus, wherein the cooling zone is intermediate the heating zone and the blocking element.

2. The apparatus according to claim 1 wherein the blocking element includes a cutting element including a cutting blade.

3. The apparatus according to claim 1 comprising a pressure sensor for determining a pressure at the blocking element.

4. The apparatus according to claim 3 comprising a control arrangement including a receiver for receipt of a signal from the pressure sensor, wherein the control arrangement controls activation of the screw vane.

5. The apparatus according to claim 1, wherein the blocking element is positioned downstream of the cooling zone.

6. The apparatus according to claim 1 wherein the one or more ports having a port inlet and a port outlet, wherein the area of the opening defined by the port inlet is different to the area of the opening defined by the port outlet.

7. The apparatus according to claim 1, wherein the screw vane is operable with the blocking element in the blocking configuration to cause compression of heterogeneous waste material against the blocking element.

8. The apparatus of claim 1, wherein a flow of compacted waste material is uninterrupted through the cooling zone.

9. The apparatus of claim 1, wherein a flow of compacted waste material is uninterrupted through the heating zone.

10. The apparatus of claim 1, wherein the compaction compartment, the heating zone, the cooling zone and the blocking element being aligned in a longitudinal axis.

11. The apparatus of claim 1, wherein said heating zone is for at least partially melting the waste material and where said cooling zone for solidifying the waste material.

* * * * *